United States Patent
Chang et al.

(10) Patent No.: US 9,339,153 B1
(45) Date of Patent: May 17, 2016

(54) WALL MOUNTING BATH ACCESSORY ASSEMBLY

(71) Applicant: GLOBE UNION INDUSTRIAL CORP., Taichung (TW)

(72) Inventors: Dulun Chang, Shen Zen (CN); Weimien Hsu, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 0 days.

(21) Appl. No.: 14/798,668

(22) Filed: Jul. 14, 2015

(51) Int. Cl.
| A47B 96/06 | (2006.01) |
| A47K 10/12 | (2006.01) |
| F16M 13/02 | (2006.01) |
| A47G 29/08 | (2006.01) |
| A47K 10/10 | (2006.01) |

(52) U.S. Cl.
CPC ............... *A47K 10/12* (2013.01); *A47G 29/08* (2013.01); *A47K 10/10* (2013.01); *F16M 13/02* (2013.01); *A47K 2201/025* (2013.01)

(58) Field of Classification Search
CPC ..... A47B 96/061; F16M 13/02; A47K 10/12; A47K 10/10; A47K 2201/025; A47G 29/08
See application file for complete search history.

(56) References Cited

U.S. PATENT DOCUMENTS

| 6,520,463 B1 * | 2/2003 | Ouano ................. A47B 96/061 248/222.11 |
| 7,571,532 B2 * | 8/2009 | Zimmerman .......... A47H 1/142 211/123 |
| 8,646,626 B2 * | 2/2014 | Hsu ........................ A47K 10/10 211/119.009 |
| 2009/0108157 A1 | 4/2009 | Spencer |

FOREIGN PATENT DOCUMENTS

| CN | 2601614 Y | 2/2004 |
| CN | 201365798 Y | 12/2009 |
| CN | 201710086 U | 1/2011 |
| CN | 201977503 U | 9/2011 |

* cited by examiner

*Primary Examiner* — Amy Sterling
(74) *Attorney, Agent, or Firm* — Alan D. Kamrath; Kamrath IP Lawfirm, P.A.

(57) ABSTRACT

A wall mounting bath accessory assembly contains: a fixing mount and a base. The fixing mount includes an inner fence, an outer fence, two peripheral fences, and two through orifices. The inner fence faces to an external face of a wall, each peripheral fence has a flexible wing, and between two free segments of two flexible wings of the two peripheral fences is defined a movable portion. The fixing mount also includes a first locking portion, and the movable portion has a second locking portion opposite to the first locking portion. The base includes a first hooking portion and a second hooking portion, wherein the second hooking portion is hooked with the second locking portion of the movable portion.

12 Claims, 10 Drawing Sheets

WALL MOUNTING BATH ACCESSORY ASSEMBLY

FIELD OF THE INVENTION

The present invention relates to a wall mounting bath accessory assembly which is fixed on a wall.

BACKGROUND OF THE INVENTION

A conventional wall mounting bath accessory assembly is used in a rack to hold cloth, cap, towel and toilet papers, and includes a fixing member and a base. The fixing member is locked to a wall by using an anchor and a first screwing bolt, and includes a peripheral surface to be covered by a disc-shaped cover on the base, and a second screwing bolts is inserted through the cover to retain the base to the fixing member, however, such the base disengages from the wall easily and is removed difficultly.

To overcome above-mentioned shortcomings, an improved wall mounting bath accessory assembly is disclosed in CN Pat. Nos. 201365798 and 2601614, and US Publication No. US 20090108157 and contains a retaining member t locked to the base in advance so that the base is fixed by using the retaining member and the fixing member without using any screwing bolts.

However, the retaining member engages with the fixing member vertically, therefore when the bath accessory assembly moves, the base disengaged from the fixing member easily by using a common disassembling operation. Therefore, the base and the retaining member are removed easily that will be taken away if they are made of precious metal materials. To obtain a theft-proof purpose, a wall mounting bath accessory assembly has to be removed by using a specific but easy operation.

Because the base is made of precious metal material, it is stolen often.

Another wall mounting bath accessory assemblies are disclosed in CN 201710086U and CN 201977503U, but they have many components and are produced complicatedly.

The present invention has arisen to mitigate and/or obviate the afore-described disadvantages.

SUMMARY OF THE INVENTION

One aspect of the present invention is to provide a wall mounting bath accessory assembly which is assembled securely or is disassembled easily.

Further aspect of the present invention is to provide a wall mounting bath accessory assembly which obtains theft-proof purpose.

Another aspect of the present invention is to provide a wall mounting bath accessory assembly which is produced quickly at a lower production cost.

To obtain the above aspects, a wall mounting bath accessory assembly provided by the present invention contains a fixing mount and a base.

The fixing mount includes an inner fence, an outer fence, two peripheral fences, and two through orifices passing through the inner fence and the outer fence. The inner fence faces to an external face of a wall; each peripheral fence has a flexible wing, and between two free segments of two flexible wings of the two peripheral fences is defined a movable portion; the fixing mount also includes a first locking portion formed on a top of the inner fence thereof; the movable portion is formed on a bottom of the fixing mount and has a second locking portion arranged thereon opposite to the first locking portion; when the fixing mount is fixed and the second locking portion of the movable portion is pushed upwardly, the second locking portion drives the two flexible wings to deform flexibly, thus moving the movable portion upwardly.

The base is formed in a cover shape and includes a first hooking portion formed on a top thereof and a second hooking portion arranged on a bottom thereof; wherein the second hooking portion is hooked with the second locking portion of the movable portion, such that when the base is pushed upwardly to force the movable portion, the two flexible wings are driven by the movable portion to deform outwardly so that the movable portion moves upwardly to force the first hooking portion toward the wall and to hook with the second locking portion of the fixing mount, thus fixing the base on the fixing mount.

DETAILED DESCRIPTION OF THE PREFERRED EMBODIMENTS

Figure 1:
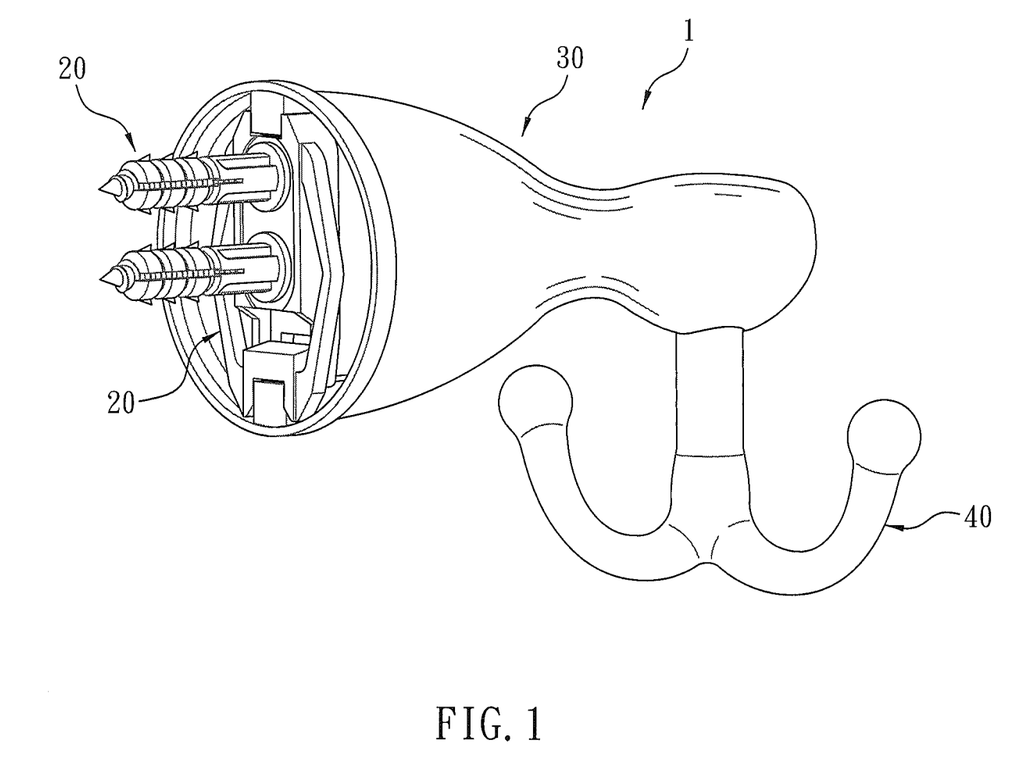
FIG. 1 is a perspective view showing the assembly of a wall mounting bath accessory assembly according to a preferred embodiment of the present invention.
Figure 2:
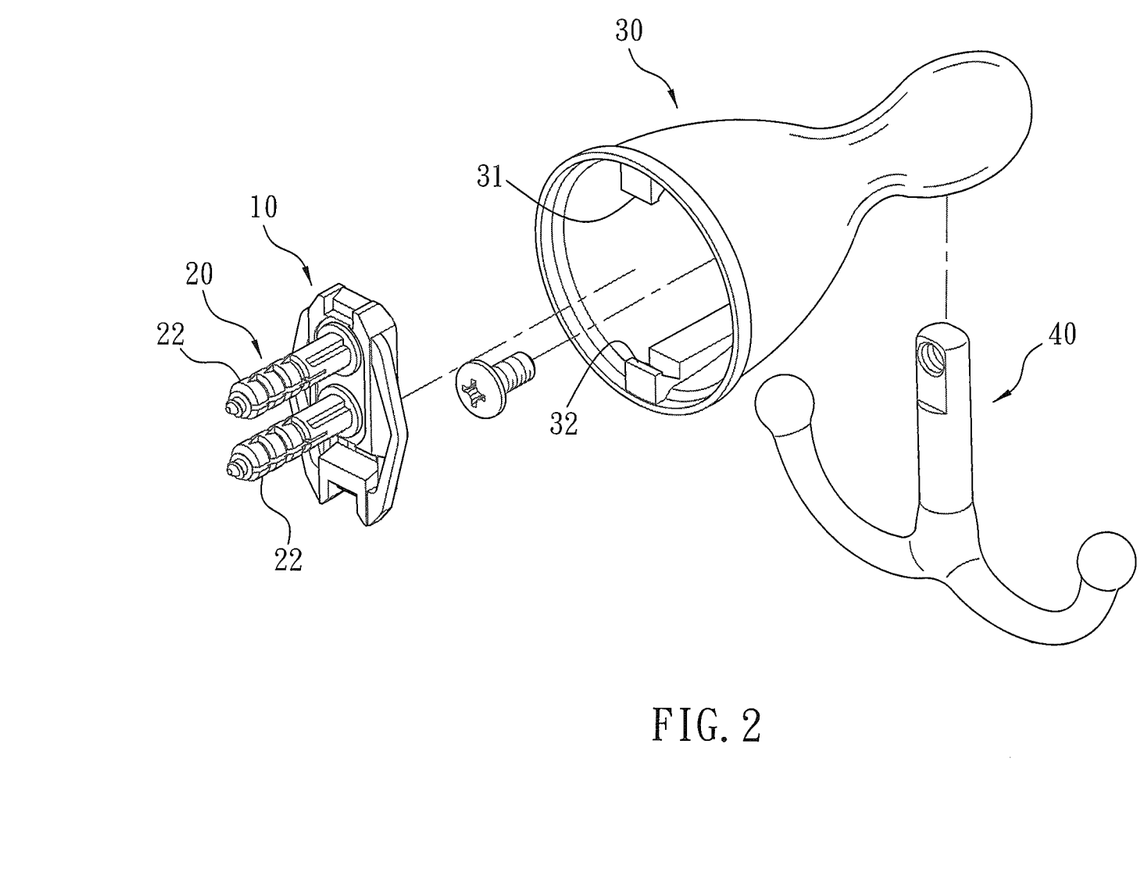
FIG. 2 is a perspective view showing the exploded components of the wall mounting bath accessory assembly according to the preferred embodiment of the present invention.
Figure 3:
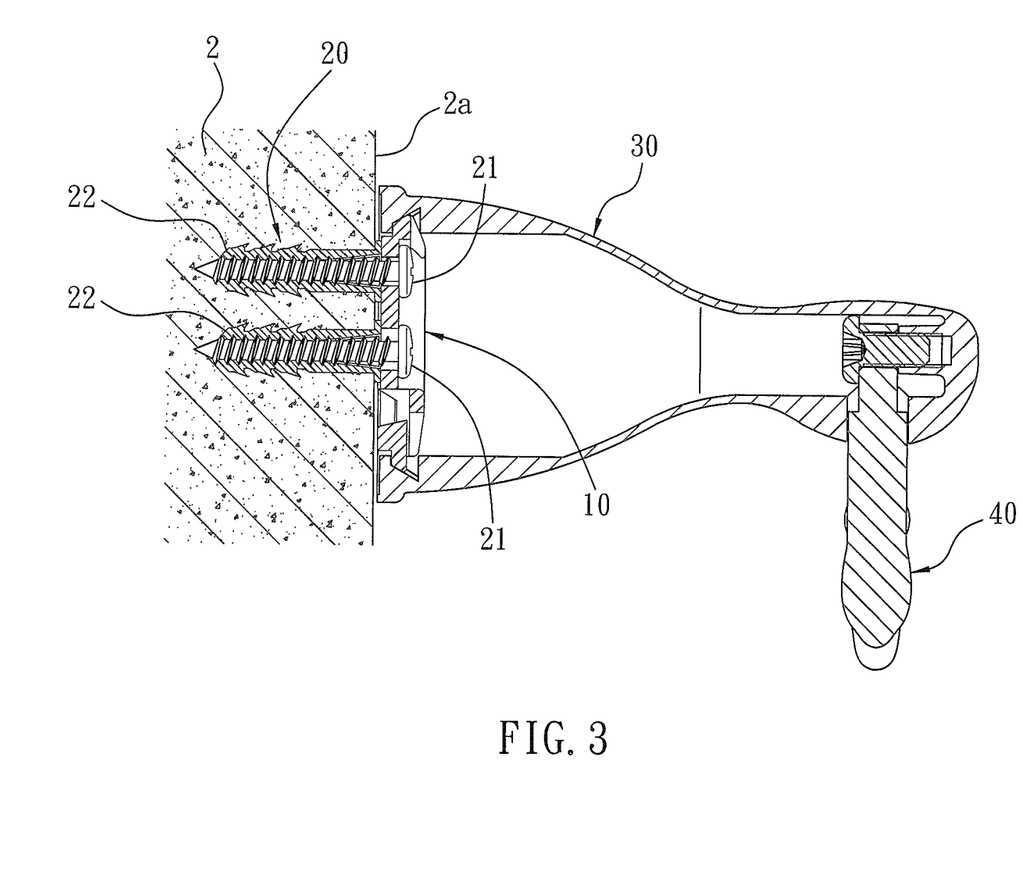
FIG. 3 is a cross sectional view showing the wall mounting bath accessory assembly being mounted on a wall according to the first embodiment of the present invention.

With reference to FIGS. 1 to 3, a wall mounting bath accessory assembly 1 according to a preferred embodiment of the present invention comprises: a fixing mount 10, a locking device 20, and a base 30.

Figure 4:
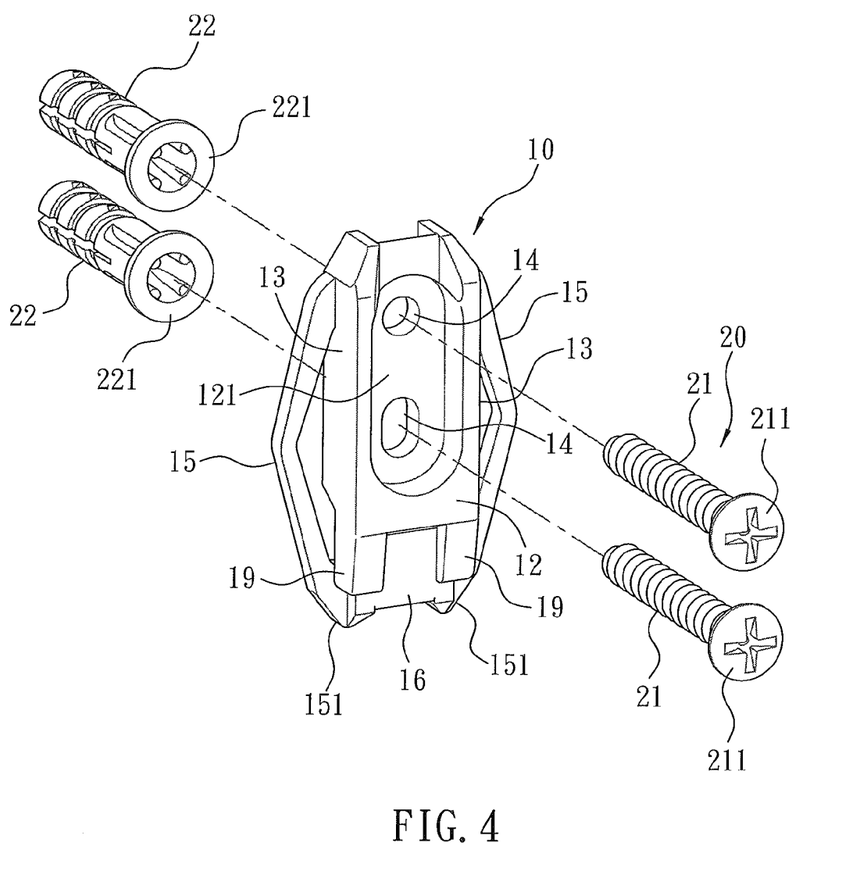
FIG. 4 is a perspective view showing the exploded components of a part of the wall mounting bath accessory assembly according to the preferred embodiment of the present invention.
Figure 5:
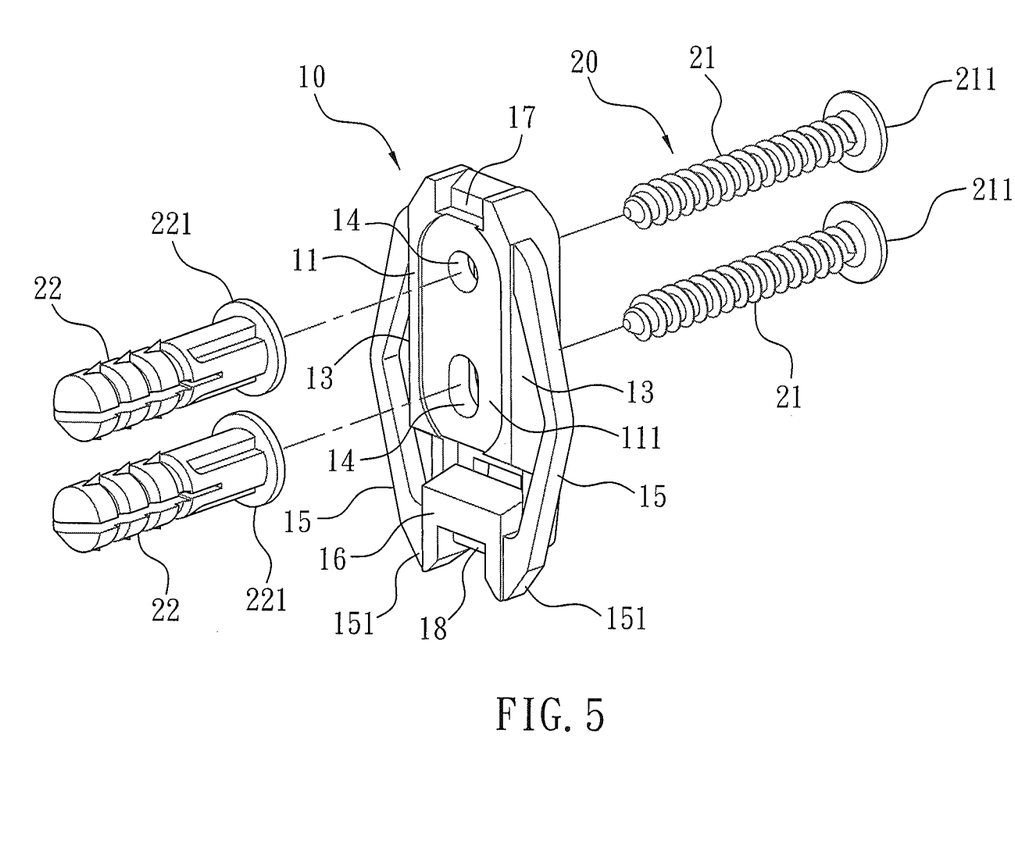
FIG. 5 is another perspective view showing the exploded components of a part of the wall mounting bath accessory assembly according to the preferred embodiment of the present invention.
Figure 6:
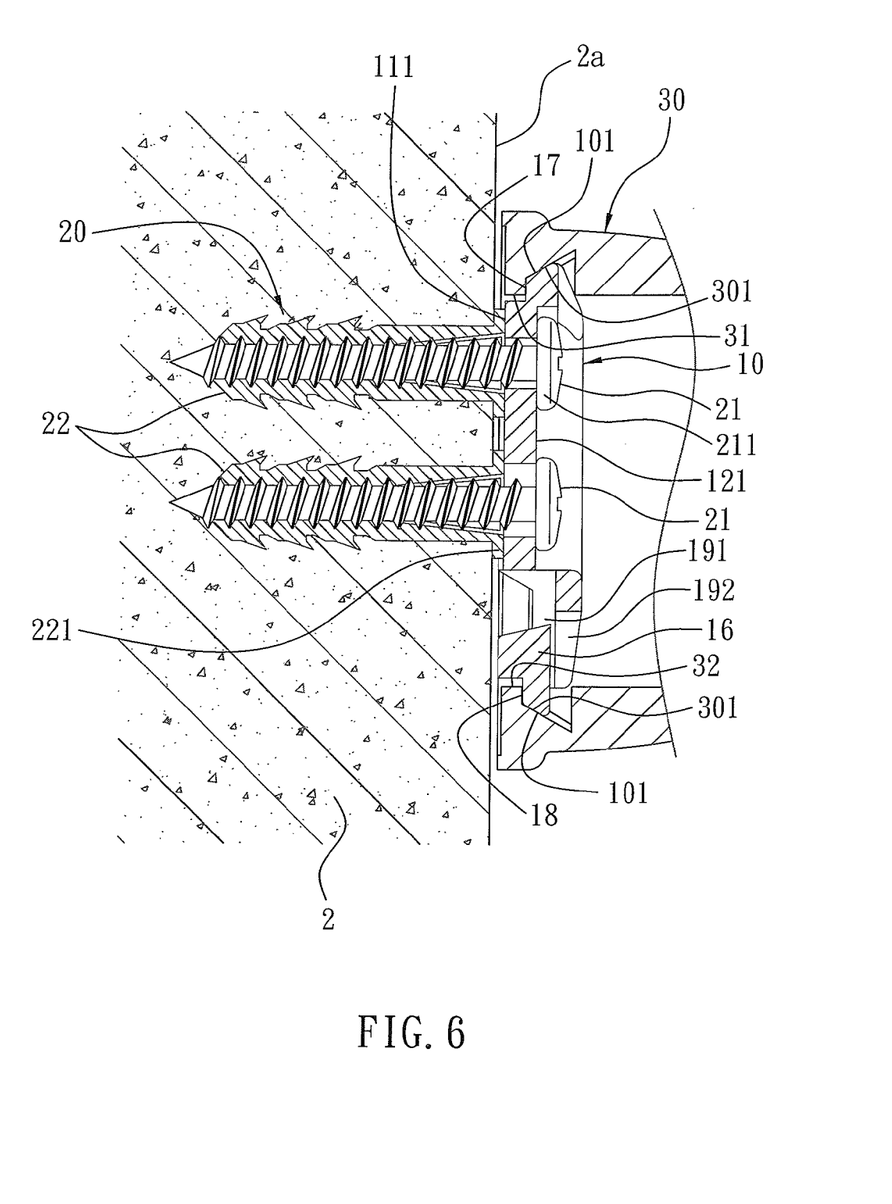
FIG. 6 is an amplified cross sectional view of a part of FIG. 10.
Figure 7:
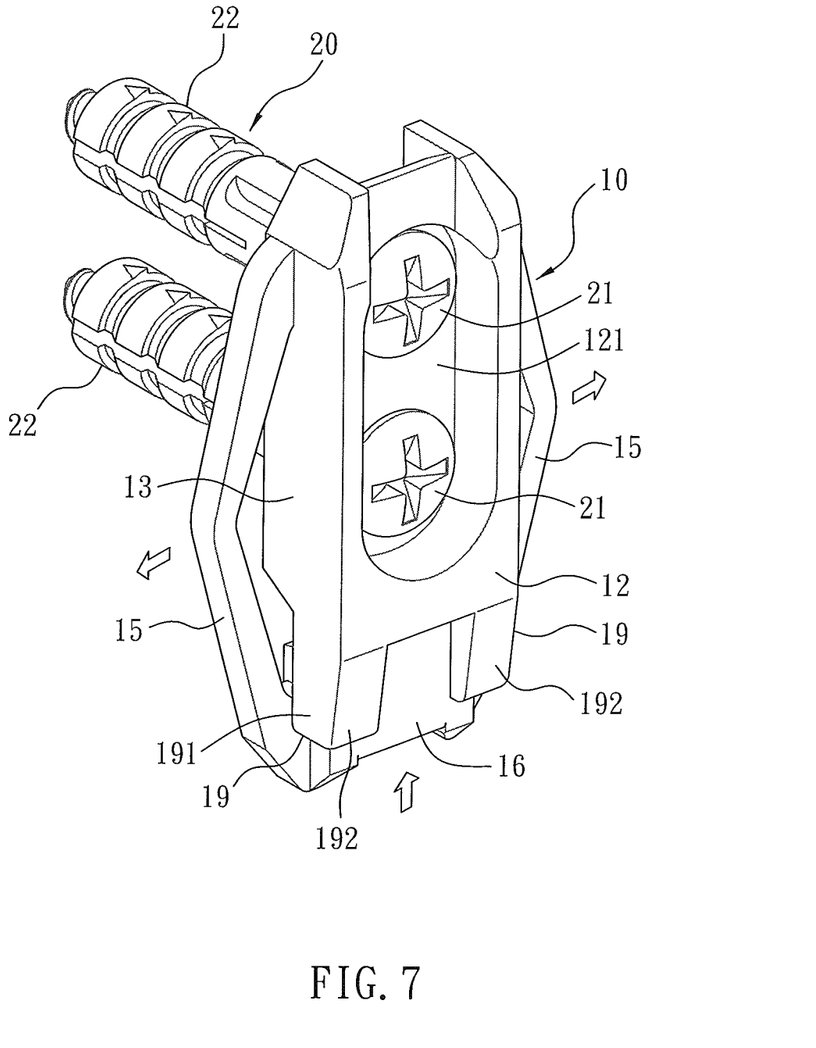
FIG. 7 is a perspective view showing the operation of a part of the wall mounting bath accessory assembly according to the preferred embodiment of the present invention.
Figure 10:
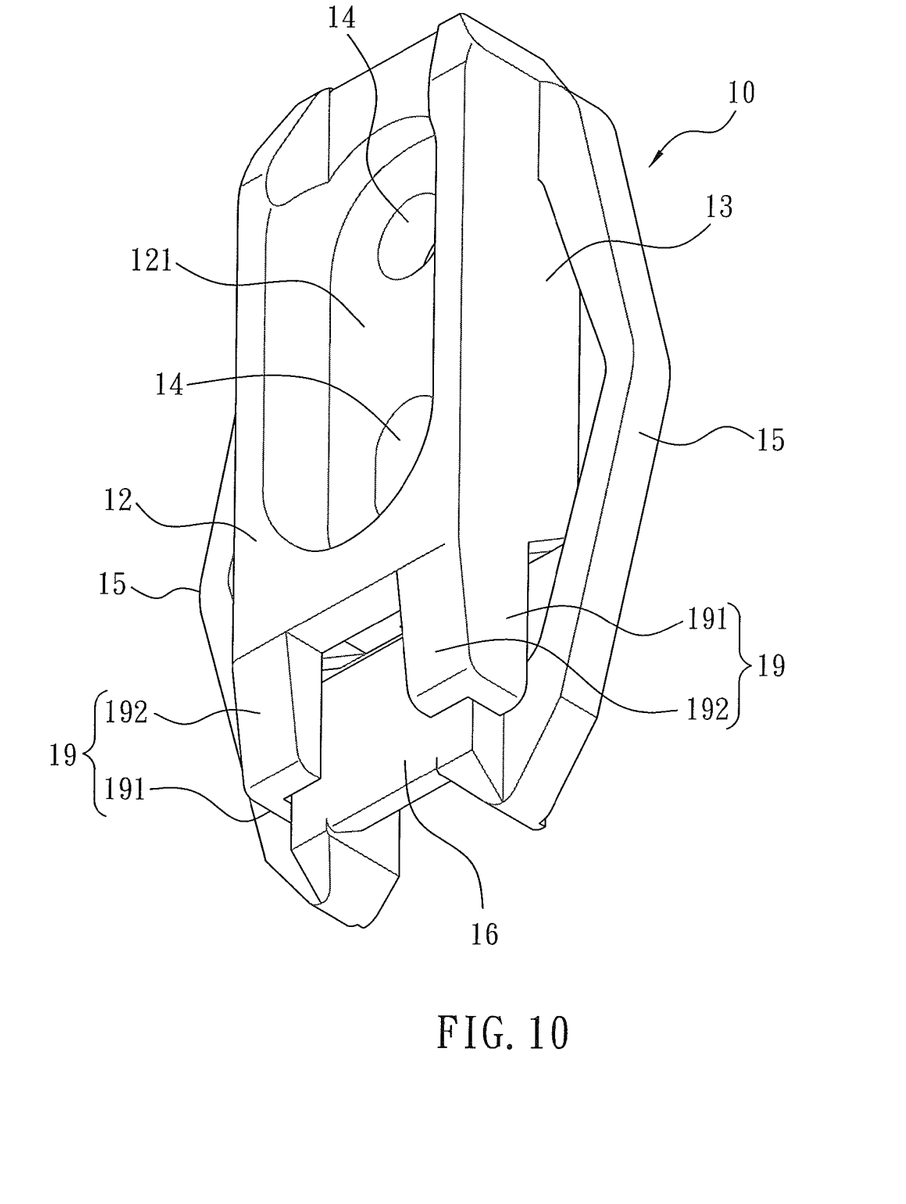
FIG. 10 is a perspective view showing the assembly of a fixing mount of the wall mounting bath accessory assembly according to the preferred embodiment of the present invention.

Referring to FIGS. 4 and 5, the fixing mount 10 includes an inner fence 11, an outer fence 12, two peripheral fences 13, and two through orifices 14 passing through the inner fence 11 and the outer fence 12, wherein the inner fence 11 faces to an external face 2a of a wall 2, as shown in FIGS. 3 and 6; each peripheral fence 13 has a flexible wing 15, and between two free segments 151 of two flexible wings 15 of the two peripheral fences 13 is defined a movable portion 16; the fixing mount 10 also includes a first locking portion 17 formed on a top of the inner fence 11 thereof; the movable portion 16 is formed on a bottom of the fixing mount 10 and has a second locking portion 18 arranged thereon opposite to the first locking portion 17, as illustrated in FIGS. 6 and 10. When the fixing mount 10 is fixed and the second locking portion 18 of the movable portion 16 is pushed upwardly, the second locking portion 18 drives the two flexible wings 15 to deform flexibly, as shown in FIG. 7, thus moving the movable portion 16 upwardly.

With reference to FIGS. 3 to 5, the locking device 20 fixes the fixing mount 10 on the external face 2a of the wall 2; wherein the inner fence 11 of the fixing mount 10 is close to or contacts with the external face 2a of the wall 2.

The locking device 20 includes two screwing bolts 21 and two anchors 22 positioned in the wall 2, such that the two screwing bolts 21 are screwed with the two anchors 22 in the wall 2 through the two through orifices 14 of the fixing mount 10, thus fixing the fixing mount 10 on the external face 2a of the wall 2.

Figure 8:
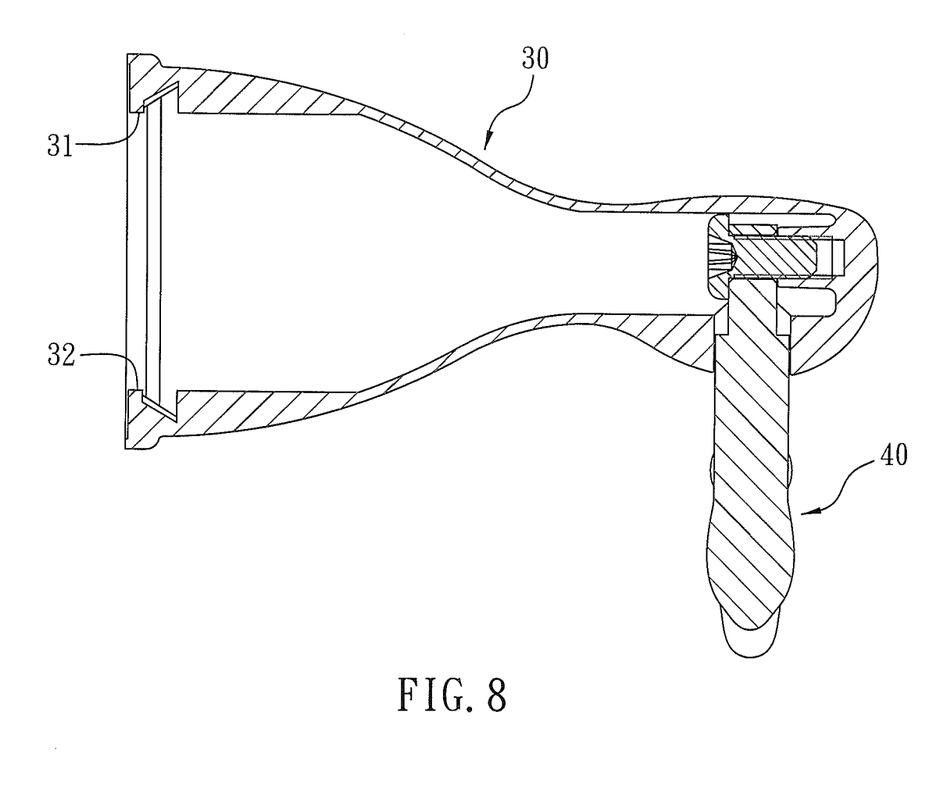
FIG. 8 is a cross sectional view showing the assembly of a part of the wall mounting bath accessory assembly according to the preferred embodiment of the present invention.
Figure 9:
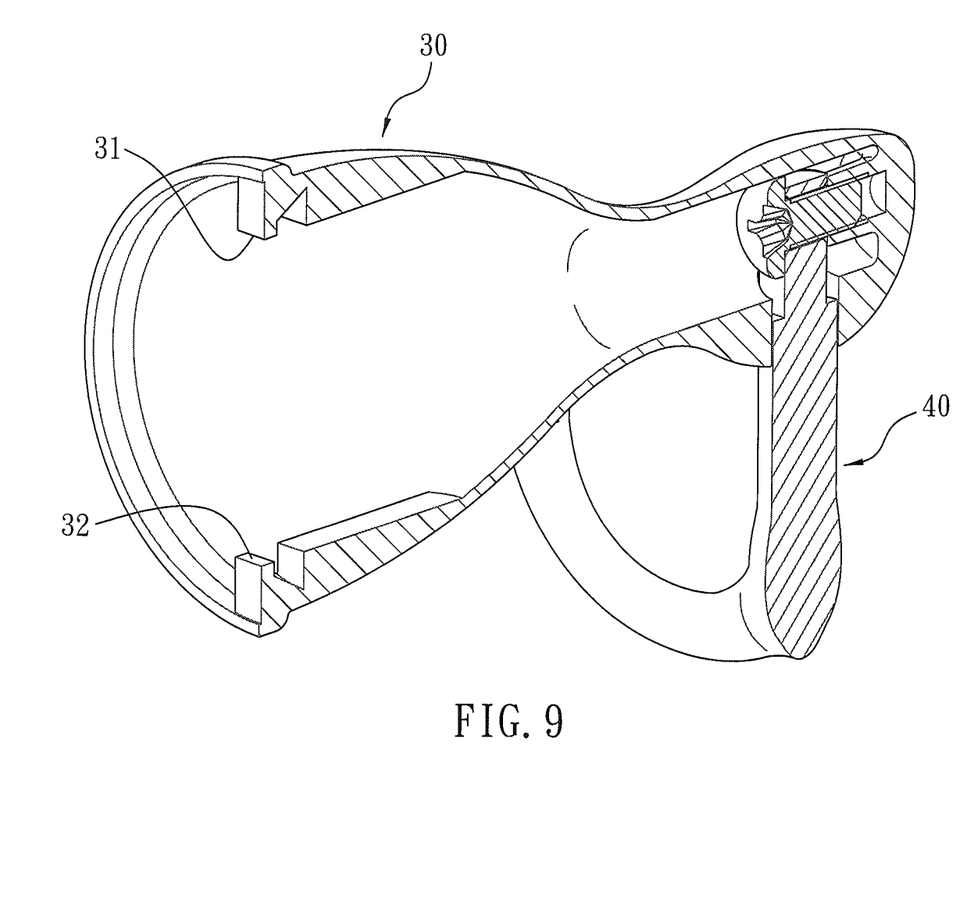
FIG. 9 is a cross-sectional perspective view showing the assembly of a part of the wall mounting bath accessory assembly according to the preferred embodiment of the present invention.

Referring to FIGS. 8 and 9, the base 30 is formed in a cover shape and includes a first hooking portion 31 formed on a top thereof and a second hooking portion 32 arranged on a bottom thereof; the second hooking portion 32 is hooked with the second locking portion 18 of the movable portion 16, as shown in FIG. 6, such that when the base 30 is pushed upwardly to force the movable portion 16, the two flexible wings 15 are driven by the movable portion 16 to deform outwardly so that the movable portion 16 moves upwardly to force the first hooking portion 31 toward the wall 2 and to hook with the first locking portion 17 of the fixing mount 10, thus fixing the base 30 on the fixing mount 10.

As shown in FIGS. 4 to 6, the inner fence 11 of the fixing mount 10 has a first recessed portion 111, the outer fence 12 of the fixing mount 10 has a second recessed portion 121; wherein the first recessed portion 111 of the inner fence 11 accommodates at least one part of a circular tab 221 of each of the two anchors 22, and the second recessed portion 121 of the outer fence 12 accommodates at least one part of a circular tab 211 of each of the two screwing bolts 21. In this embodiment, the first recessed portion 111 of the inner fence 11 of the fixing mount 10 contacts with the circular tab 221 of each of the two anchors 22 or the inner fence 11 of the fixing mount 10 contacts with the external face 2a of the wall 2.

The two through orifices 14 of the fixing mount 10 pass through the first recessed portion 111 of the inner fence 11 and the second recessed portion 121 of the outer fence 12, and one of the two through orifices 14 is circular, the other of the two through orifices 14 is oval to adjustably insert one of the two screwing bolts 21 so that the one of the two screwing bolts 21 aligns and screws with one of the two anchors 22 via the other of the two through orifices 14.

Each flexible wing 15 is elongated and has an outward V-shaped extension formed on a middle section thereof, such that each flexible wing 15 deforms outwardly after being forced. This is, when each flexible wing 15 is pushed by the movable portion 16, it deforms outwardly so that the movable portion 16 moves upwardly.

In this embodiment, the fixing mount 10 further includes two limiting protrusions 19 extending outwardly from two sides of the bottom thereof, as shown in FIG. 4, such that the movable portion 16 is limited to move among the two limiting protrusions 19 and the external face 2a of the wall 2. With reference to FIG. 10, each limiting protrusion 19 has a horizontal fringe 191 and a vertical fringe 192, such that the horizontal fringe 191 limits the movable portion 16 to move horizontally, and the vertical fringe 192 limits the movable portion 16 to offset away from the wall 2. Thereby, the two limiting protrusions 19 prevent an offset of the movable portion 16. The movable portion 16 is guided to slide by the horizontal fringe 191 and the vertical fringe 192 of each limiting protrusion 19.

With reference to FIG. 6, the fixing mount 10 further includes a first tilted face 101 connecting with each of the first locking portion 17 and the second locking portion 18. The base 30 also includes a second tilted face 301 coupling with each of the first hooking portion 31 and the second hooking portion 32, such that when the first hooking portion 31 hooks with the first locking portion 17, and the second hooking portion 32 hooks with the second locking portion 18, the second tilted face 301 contacts with the first tilted face 101; hence when the base 30 is removed from the fixing mount 10, the first hooking 31 and the second hooking portion 32 remove from the fixing mount 10 across the second titled face 301. Accordingly, when the bottom of the base 30 moves upwardly and is hit, it does not remove from the fixing mount 10, thus avoiding the base 30 and objects which hang on the base 30 falling on a ground.

Referring to FIGS. 5 and 6, each of the first locking portion 17 and the second locking portion 18 is a stepped face; each of the first hooking portion 31 and the second hooking portion 32 is a stepped projection so that the first hooking portion 31 hooks with the first locking portion 17, and the second hooking portion 32 hooks with the second locking portion 18.

The fixing mount 10 is rejection molded from plastic material to one piece form the inner fence 11, the outer fence 12, the two peripheral fences 13, the two flexible wings 15, the movable portion 16, and the two limiting protrusions 19, thus producing the fixing mount 10 easily and quickly to reduce production cost.

With reference to FIG. 7, in assembly, the fixing mount 10 is locked on the external face 2a of the wall 2 by ways of the two anchors 22 and the two screwing bolts 21, thus fixing the base 30 and the fixing mount 10 together.

Referring to FIG. 2, in assembly, the second hooking portion 32 of the base 30 is hooked with the second locking portion 18 of the movable portion 16, and the base 30 is pushed upwardly so that the movable portion 16 drives the two flexible wings 15 to deform outwardly, and the movable portion 16 moves upwardly until the first hooking portion 31 of the base 30 moves toward a top of the fixing mount 10. Thereafter, the base 30 is pressed downwardly so that the first hooking portion 31 moves toward the first locking portion 17 across the top of the fixing mount 10, and after releasing the base 30, the two flexible wings 15 of the fixing mount 10 drive the movable portion 16 to actuate the base 30, and the base 30 is actuated by the movable portion 16 to move downwardly, hence the first hooking portion 31 hooks with the first locking portion 17 to fix the base 30 and the fixing mount 10 quickly and easily, as shown in FIGS. 3 and 6, the first hooking portion 31 hooks with the first locking portion 17 and the second hooking portion 32 hooks with the second locking portion 18 securely by using the two flexible wings 15 of the fixing mount 10.

The base 30 is removed from the fixing mount 10 easily and quickly, for example, the user pushes the base 30 upwardly so that the first hooking portion 31 removes from the first locking portion 17, and then the base 30 is pulled downwardly so that the second hooking portion 32 removes from the second locking portion 18, thus removing the base 30 from the fixing mount 10 quickly and easily.

After the base 30 is pushed upwardly, it is pulled away from the wall 2, and then the base 30 is removed downwardly from the fixing mount 10 in a specific removing manner, thus obtaining theft-proof purpose.

With reference to FIGS. 1, 8 and 9, the base 30 has a hanging hook 40 fixed thereon or between two bases 30 is fixed a hanging rod to hang a towel or other bathing articles.

When the fixing mount 10 is mounted upside down (for instance, the first locking portion 17 is formed on a top of the inner fence 11 thereof, and the movable portion 16 and the second locking portion 18 are arranged on the bottom of the fixing mount 10), the objects presses the movable portion 16 of the fixing mount 10 through the base 20, and the movable portion 16 drives the two flexible wings 15 to deform outwardly, thus causing a flexible fatigue of the two flexible wings 15.

Thereby, the wall mounting bath accessory assembly 1 is assembled easily and quickly, and it is simplified to cause production cost. In addition, the fixing mount 10 is rejection molded from the plastic material to decrease its weight.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A wall mounting bath accessory assembly comprising:
a fixing mount including an inner fence, an outer fence, two peripheral fences, and two through orifices passing through the inner fence and the outer fence; wherein the inner fence faces to an external face of a wall; each peripheral fence has a flexible wing, and between two free segments of two flexible wings of the two peripheral fences is defined a movable portion; the fixing mount also includes a first locking portion formed on a top of the inner fence thereof; the movable portion is formed on a bottom of the fixing mount and has a second locking portion arranged thereon opposite to the first locking portion; when the fixing mount is fixed and the second locking portion of the movable portion is pushed upwardly, the second locking portion drives the two flexible wings to deform flexibly, thus moving the movable portion upwardly;
a base formed in a cover shape and including a first hooking portion formed on a top thereof and a second hooking portion arranged on a bottom thereof; wherein the second hooking portion is hooked with the second locking portion of the movable portion, such that when the base is pushed upwardly to force the movable portion, the two flexible wings are driven by the movable portion to deform outwardly so that the movable portion moves upwardly to force the first hooking portion toward the wall and to hook with the second locking portion of the fixing mount, thus fixing the base on the fixing mount;
wherein each of the first locking portion and the second locking portion is a stepped face; each of the first hooking portion and the second hooking portion is a stepped projection so that the first hooking portion hooks with the first locking portion, and the second hooking portion hooks with the second locking portion.

2. The wall mounting bath accessory assembly as claimed in claim 1 further comprising a locking device for fixing the fixing mount on the external face of the wall.

3. The wall mounting bath accessory assembly as claimed in claim 2, wherein the locking device includes two screwing bolts and two anchors positioned in the wall, such that the two screwing bolts are screwed with the two anchors in the wall through the two through orifices of the fixing mount, thus fixing the fixing mount on the external face of the wall.

4. The wall mounting bath accessory assembly as claimed in claim 3, wherein the inner fence of the fixing mount has a first recessed portion, the outer fence of the fixing mount has a second recessed portion; wherein the first recessed portion of the inner fence accommodates at least one part of a circular tab of each of the two anchors, and the second recessed portion of the outer fence accommodates at least one part of a circular tab of each of the two screwing bolts.

5. The wall mounting bath accessory assembly as claimed in claim 4, wherein the two through orifices of the fixing mount pass through the first recessed portion of the inner fence and the second recessed portion of the outer fence, and one of the two through orifices is circular, the other of the two through orifices is oval.

6. The wall mounting bath accessory assembly as claimed in claim 1, wherein each flexible wing is elongated and has an outward V-shaped extension formed on a middle section thereof, such that each flexible wing deforms outwardly after being forced.

7. The wall mounting bath accessory assembly as claimed in claim 1, wherein the fixing mount further includes two limiting protrusions extending outwardly from two sides of the bottom thereof, such that the movable portion is limited to move among the two limiting protrusions and the external face of the wall.

8. The wall mounting bath accessory assembly as claimed in claim 7, wherein each limiting protrusion has a horizontal fringe and a vertical fringe, such that the horizontal fringe limits the movable portion to move horizontally, and the vertical fringe limits the movable portion to offset away from the wall.

9. The wall mounting bath accessory assembly as claimed in claim 7, wherein each limiting protrusion has a horizontal fringe and a vertical fringe, such that the movable portion is guided to slide by the horizontal fringe and the vertical fringe of each limiting protrusion.

10. The wall mounting bath accessory assembly as claimed in claim 1, wherein the fixing mount further includes a first tilted face connecting with each of the first locking portion and the second locking portion; the base also includes a second tilted face coupling with each of the first hooking portion and the second hooking portion, such that when the first hooking portion hooks with the first locking portion, and the second hooking portion hooks with the second locking portion, the second tilted face contacts with the first tilted face.

11. The wall mounting bath accessory assembly as claimed in claim 1, wherein the fixing mount is rejection molded from plastic material.

12. The wall mounting bath accessory assembly as claimed in claim 1, wherein the base has a hanging hook fixed thereon.

* * * * *